United States Patent [19]

Veltman et al.

[11] Patent Number: 4,732,579
[45] Date of Patent: Mar. 22, 1988

[54] AIR PURIFICATION AND TEMPERATURE CONTROLLING SYSTEM AND METHOD

[75] Inventors: Joost Veltman, San Jose; Ram L. Malik, Fremont; Michael D. Dickens, Danville, all of Calif.

[73] Assignee: FMC Corporation, Chicago, Ill.

[21] Appl. No.: 852,006

[22] Filed: Apr. 14, 1986

[51] Int. Cl.$^4$ .............................................. B01D 53/04
[52] U.S. Cl. .......................................... 55/23; 55/26; 55/27; 55/76; 55/180; 55/208; 55/267; 55/387
[58] Field of Search ............................. 55/23, 25–27, 55/58, 62, 76, 162, 179, 180, 182, 208, 387, 389

[56] References Cited

U.S. PATENT DOCUMENTS

| | | | |
|---|---|---|---|
| 1,831,644 | 11/1931 | Adair et al. | 55/23 X |
| 2,497,421 | 2/1950 | Shiras | 55/27 X |
| 3,221,477 | 12/1965 | Arnoldi et al. | 55/58 X |
| 3,800,507 | 4/1974 | Howell et al. | 55/179 X |
| 3,880,616 | 4/1975 | Myers et al. | 55/179 X |
| 4,231,768 | 11/1980 | Seibert et al. | 55/179 |
| 4,285,917 | 8/1981 | Knight | 55/23 X |
| 4,322,225 | 3/1982 | Bellinger et al. | 55/27 |
| 4,349,357 | 9/1982 | Russell | 55/62 X |
| 4,449,990 | 5/1984 | Tedford, Jr. | 55/58 X |
| 4,560,394 | 12/1985 | McDonald et al. | 55/27 X |

OTHER PUBLICATIONS

Article entitled Fixed-Bed Adsorption by H. M. Barry appearing in publication Chemical Engineering, dated Feb. 8, 1960.
A Holset Engineering Company brochure entitled H3B Torbocharger.

*Primary Examiner*—Robert Spitzer
*Attorney, Agent, or Firm*—A. J. Moore; H. M. Stanley; R. B. Megley

[57] ABSTRACT

A system and method provides a continuous supply of clean air at a desired temperature to the crew members of a combat vehicle when in an environment contaminated by nuclear, biological or chemical warfare agents. The contaminated air is initially compressed by energy received from the exhaust gases from a combustion power unit of the vehicle, the initially compressed air is then cooled to increase its density and is then compressed and cooled a second time before being passed through a pressure swing adsorbent system which continuously removes all known contaminants from the air, and is then expanded and changed in temperature to provide clean air at a desired temperature to personnel within the vehicle. The energy released from the air during expansion is used to compress the air the second time thereby providing a very energy efficient system.

31 Claims, 8 Drawing Figures

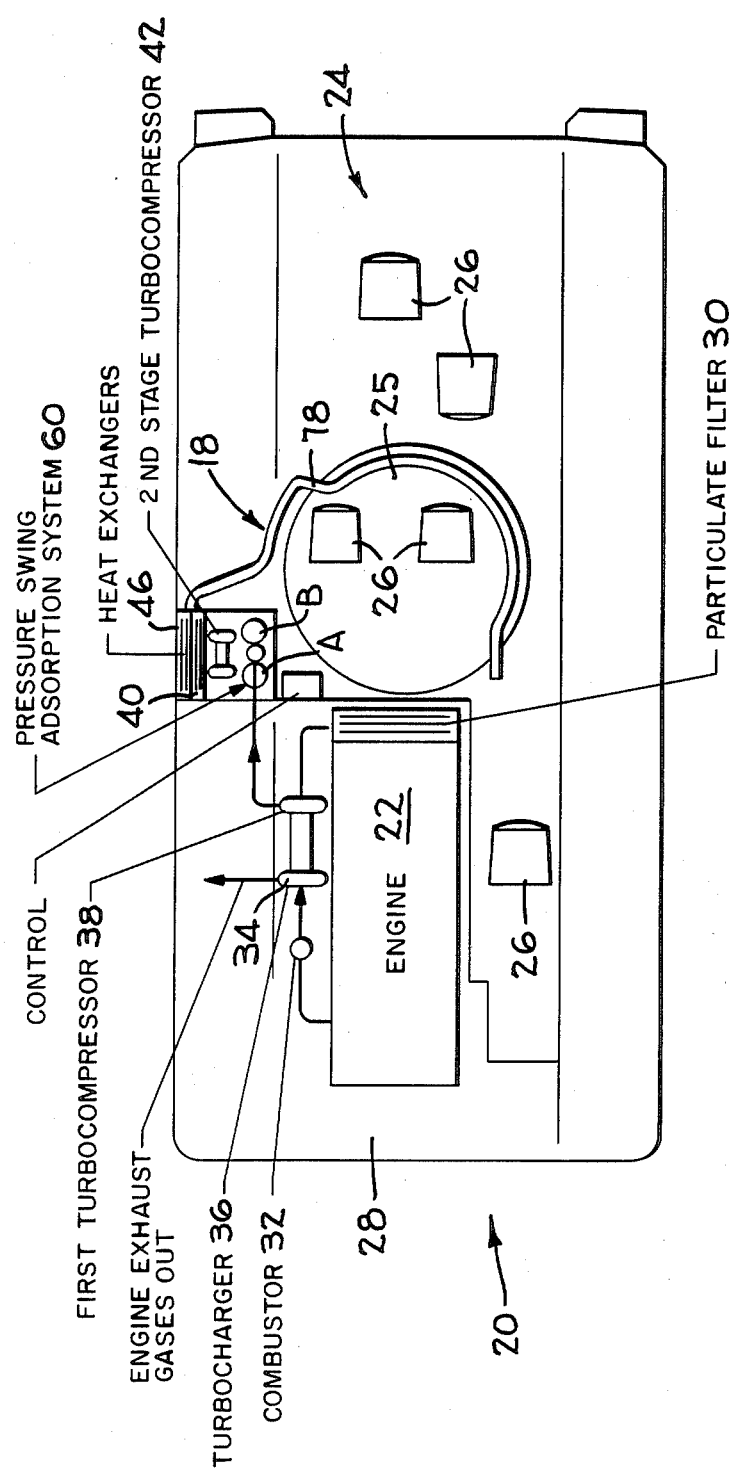
FIG_1

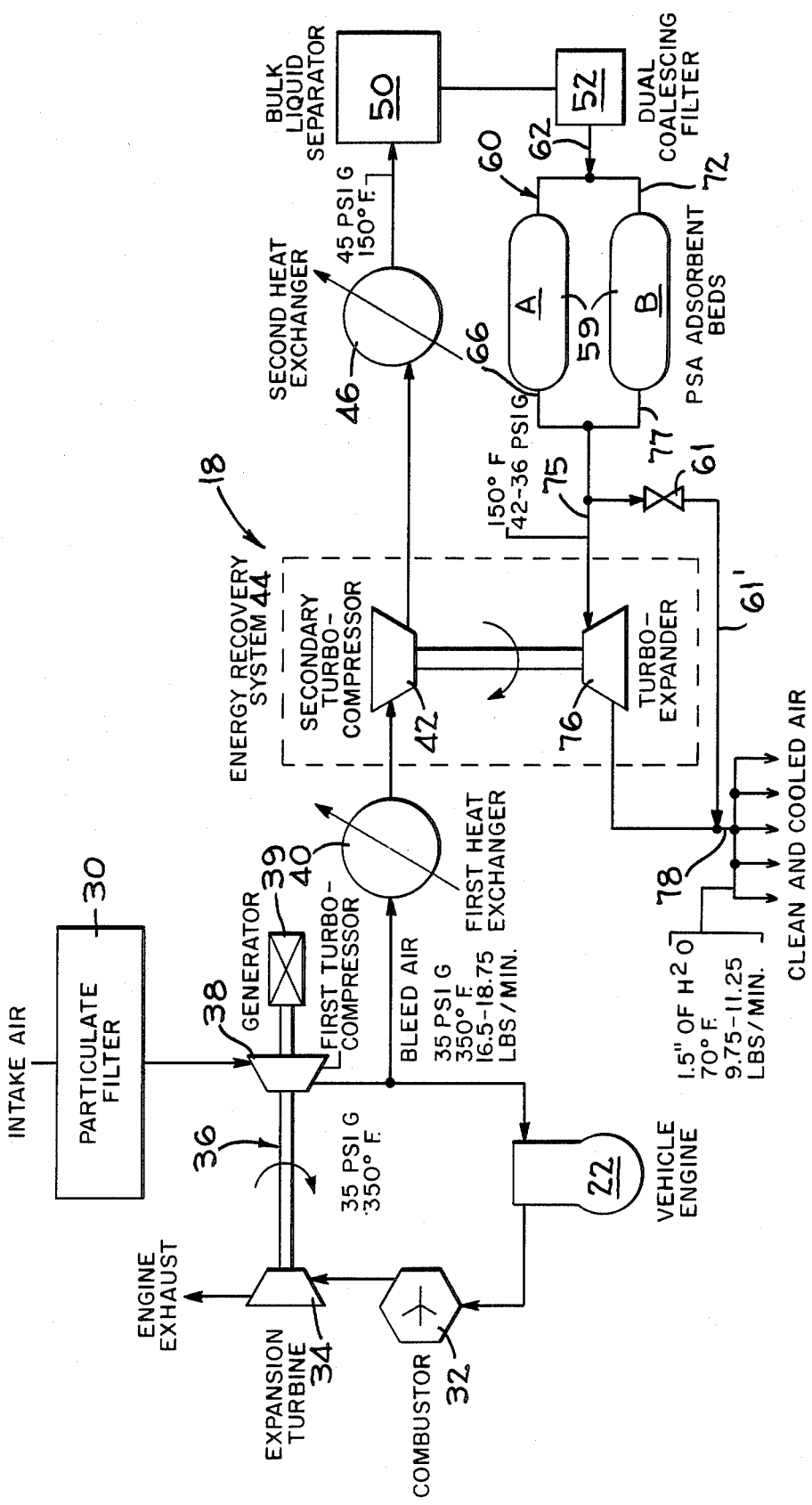

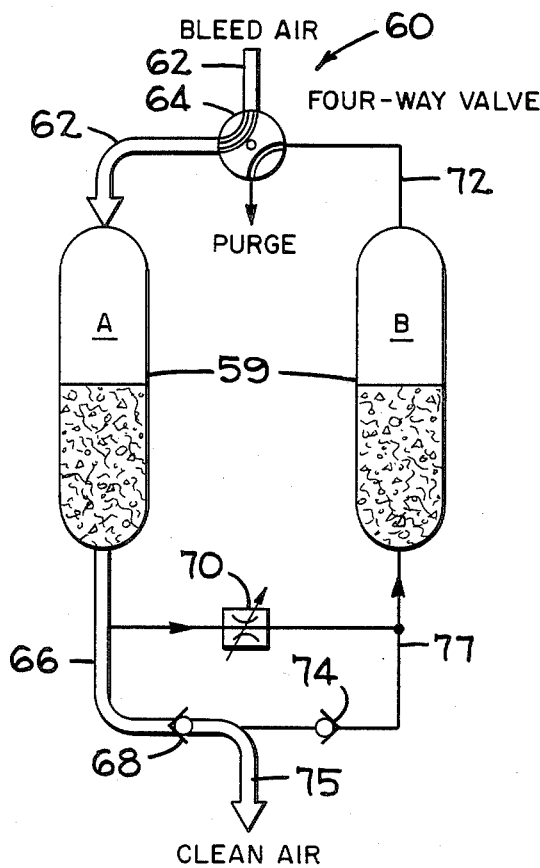
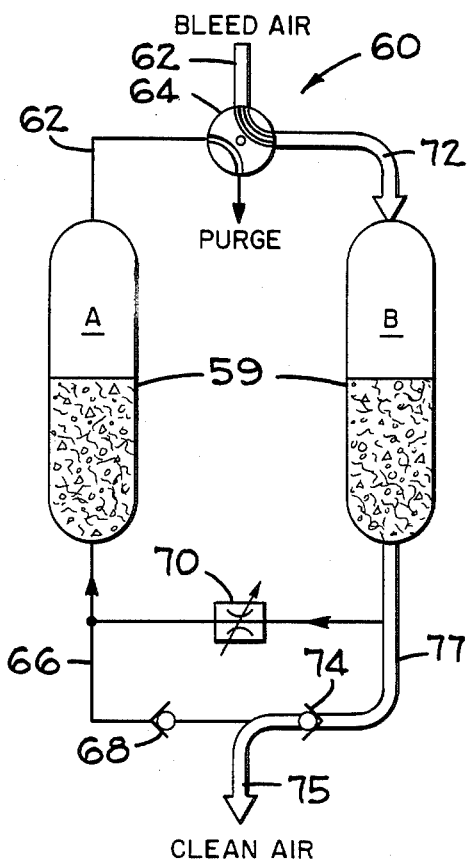
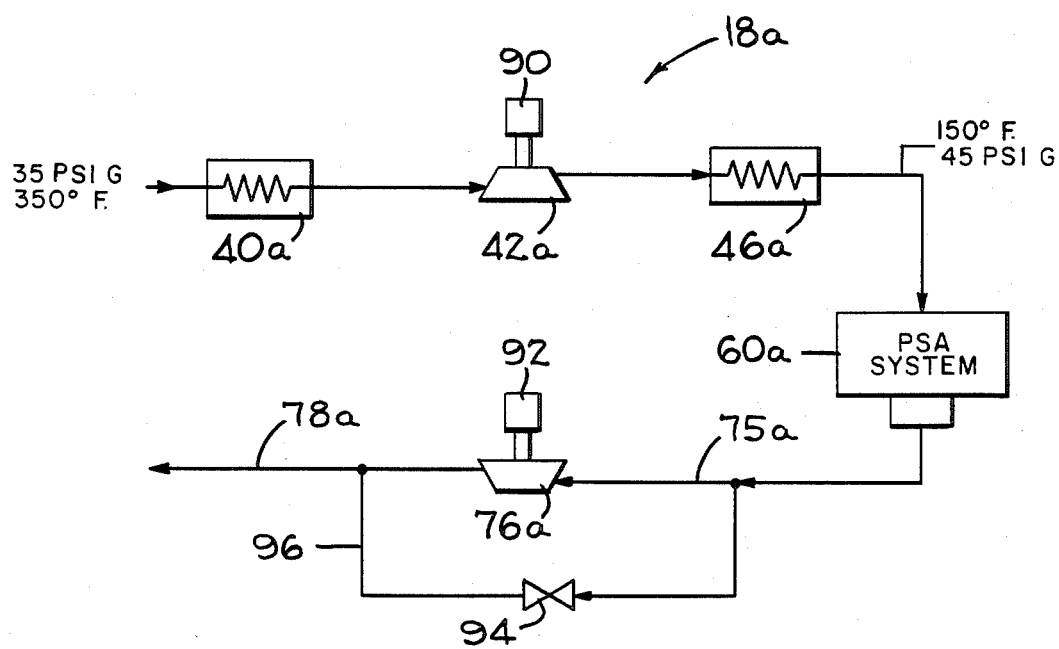

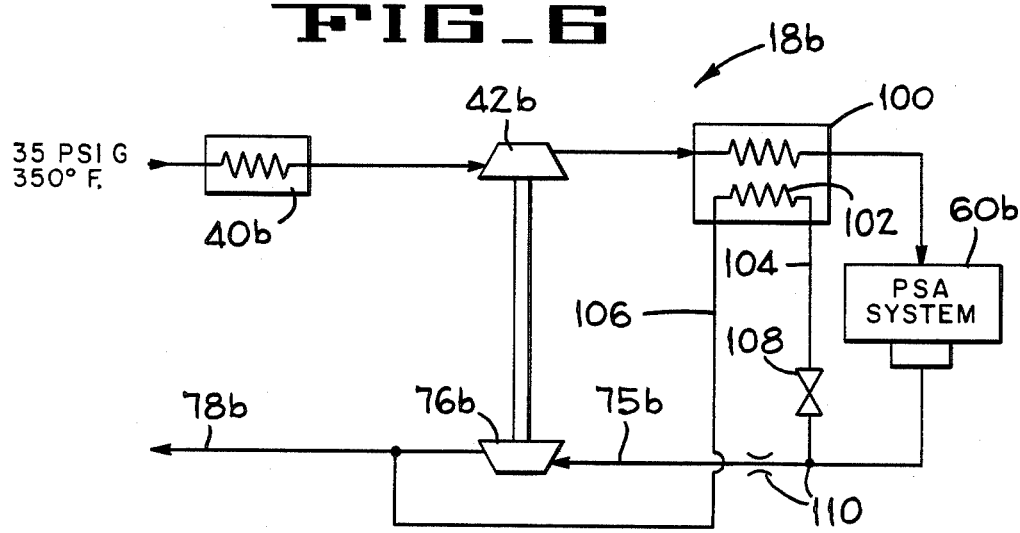
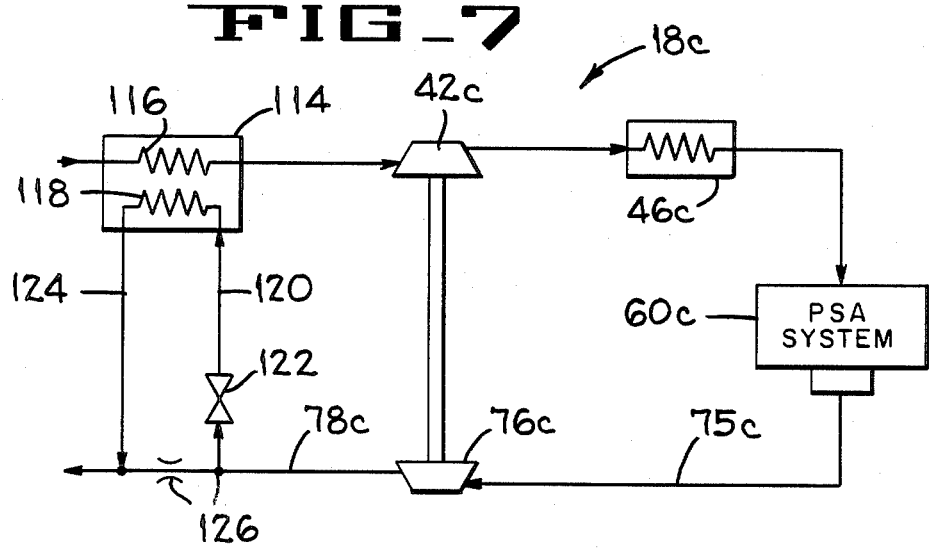
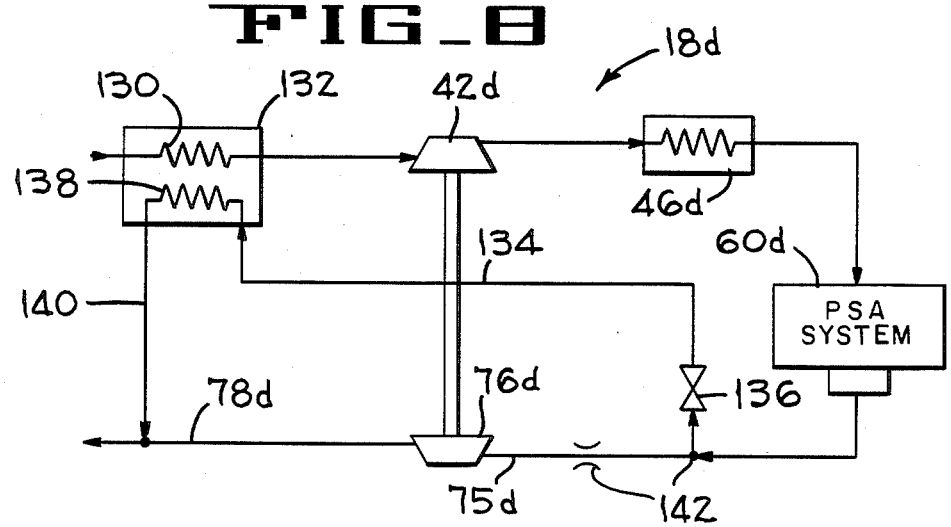

AIR PURIFICATION AND TEMPERATURE CONTROLLING SYSTEM AND METHOD

BACKGROUND OF THE INVENTION

1. Field of the Invention

The present invention pertains to a method and apparatus for purifying and thereafter changing the temperature of air, and more particularly relates to such a system for continuously removing hazardous nuclear, biological and chemical warfare agents from air and supplying cool clean air to standard masks and microclimate suits worn by personnel within the crew compartment of a combat vehicle or the like with optimum energy consumption.

2. Description of the Prior Art

A soldier runs the risk of being exposed to several hazardous materials such as chemical and biological warfare agents, and radioactive fallout from nuclear detonations. In conjunction with various forms of the protective clothing or shelters, he requires a source of cool and clean air to breathe and to minimize fatigue and shock. The conventional means of providing cool and clean air to the crew in a vehicle is through the use of disposable charcoal filters and a separate air conditioning device. The disposable filters represent a considerable logistical burden to the user since they are large, heavy, have a limited useful life, are expensive and can be used only once. After use, the filters can become contaminated, are hazardous to handle and must be replaced. Thus, a large supply of filters must be available and the vehicle may have to be moved to a clean area before the filters are changed thereby reducing the vehicle battlefield availability. The vehicle, and personnel therein, could be rendered useless if replacement filters were unavailable while in a chemical warfare environment. Also, the use of a separate air conditioner in many vehicles may be undesirable or impractical due to space limitations in the vehicle. Cool air is required by the crew to breathe and prevent heat stress, when wearing protective clothing to perform extended duties in a contaminated battlefield.

SUMMARY OF THE INVENTION

In accordance with the present invention a first embodiment discloses a single system which continuously provides clean air from which nuclear, biological and chemical warfare agents have been removed; and which air is cooled to about 70° F. (Fahrenheit) before it enters conventional protective suits and masks worn by the crew in the crew compartment within a vehicle. The conventional masks and protective suits (not shown) have fluid flow passages therein through which the clean air flows at about 70° F. to maintain the crew at a desirable temperature, and provides a source of clean cool air which the crew breathes. The incoming contaminated air is increased in pressure by a first turbocharger driven by energy from the otherwise wasted exhaust gases from the engine; or if the engine is not running, the turbocharger is driven by an alternate power source such as a combuster within which fuel is burned. The high pressure air, from the compression turbine of the turbocharger, when powered by either source of energy, is cooled to increase its density and is then directed into a secondary turbocompressor to increase its pressure and is again cooled before being directed into one bed of a pressure swing adsorption system which together with pre-filters removes all contaminates from the air. These pre-filters may be incorporated within the pressure swing adsorption system if desired. The high pressure clean air discharged from the pressure swing adsorption system drives a turboexpander connected to the secondary turbocompressor of an energy recovery system and is discharged as cool clean air into the masks and protective suits worn by the crew. The air temperature provided to the crew is at about 70° F. and slightly above atmospheric pressure. A portion of the clean air is directed into another bed of the pressure swing adsorption system to regenerate (self-clean) that bed by purging all contaminates therefrom. At even intervals of about 30 seconds, the high pressure air and the purging air entering the two beds of the pressure swing adsorption system are reversed thus providing a continuous air purification and cooling system.

Although a pressure swing adsorption system is the preferred system, other sorption systems may be used. Sorption systems are defined as a "general term used to encompass the processes of adsorption, absorption, desorption, ion exchange, ion exclusion, ion retardation, chemisorption, and dialysis."

BRIEF DESCRIPTION OF THE DRAWINGS

FIG. 1 is a diagrammatic plan of a military vehicle illustrating the location of the several components of the air purification and temperature controlling system of the present invention.

FIG. 2 is a diagrammatic view of the first embodiment of a purification and temperature controlling system of the present invention illustrating the directional flow of the air and engine exhaust gases indicating approximate temperature, pressures and pounds of mass per minute at different locations in the system; and with the details of the purging flow not shown.

FIG. 3 is a diagrammatic view of the pressure swing adsorption system illustrating a first bed of the pressure swing adsorption system purifying incoming air, while a second bed of the system is being regenerated by purging contaminates therefrom with a small amount of clean air bled from the first bed, said view also illustrating a first location of the conduits used for purging contaminants from the bed.

FIG. 4 is similar to FIG. 3 but illustrates the second bed receiving incoming air and the first bed being regenerated.

FIG. 5 is a diagram of a portion of a second embodiment of the invention downstream of the first turbocompressor of the first embodiment illustrating separate drives for the secondary turbocompressor and turboexpander.

FIG. 6 is a diagram illustrating a portion of a third embodiment of the invention illustrating a modified energy recovery system.

FIG. 7 is a diagram similar to FIG. 6 of a fourth embodiment of the invention illustrating another energy recovery system.

FIG. 8 is a diagram similar to FIG. 6 illustrating a fifth embodiment of the invention.

DESCRIPTION OF THE PREFERRED EMBODIMENT

The air purification and temperature controlling system 18 (FIG. 1) of the first embodiment of the present invention is intended for use in combat vehicles 20 for continuously removing nuclear, biological and chemical contaminates from the air while controlling the temperature of the air for providing clean air at about 70° F. to conventional suits and masks (not shown) worn by the crew of the vehicle. It will be understood, however, that the system may be used in other environments where combustion power means, such as an engine is available, or from other sources of compressed air such as turbine bleed air from a turbine powered vehicle, jet aircraft, or similar power means. For example, the system may be used to provide clean cool air to one or more people in buildings, aircraft, ships, and private or commercial vehicles.

In accordance with the preferred embodiment of the present invention the military combat vehicle 20 (FIG. 1) includes an engine 22 which drives wheels or tracks (not shown) and other powered components in the vehicle. The vehicle includes an enclosed crew compartment 24 which may include a turret 25 with seats 26 therein for the crew, five seats being illustrated in FIG. 1.

The engine 22 is located in a separate compartment 28 and includes a conventional completely regenerative particulate filter 30 (FIG. 2) which removes approximately 95% of the dust and other particulates from the air. A major portion of the filtered air is used in the combustion chamber of the engine 22. The exhaust gases from the engine pass through a combuster 32 (to be described hereinafter) and drives an expansion turbine 34 of a turbocharger 36 such as a Holset H3B turbocharger, manufactured by Holset Engineering Company Ltd., Turnbridge, Huddersfield, England. The turbocharger 36 also includes an air compression stage 38 which is driven by the expansion turbine 34 and receives air from the filter 30 and compresses the air. The compression of the air with the compression stage 38 has the effect of heating the air, raising its pressure and thus adding energy to the air. The turbocharger 36 may also drive another mechanism in the vehicle, such as a generator 39 as illustrated in FIG. 2.

The compressed air discharged by the compression stage 38 is at a relatively low, energy conserving, pressure; preferably about 35 psig. and at a temperature of about 350° F. As previously mentioned, a major portion of this compressed air is directed into the engine 22. The remaining pressurized bleed air to be further purified and cooled is first directed through a first heat exchanger 40, which is preferably a conventional air-to-air heat exchanger. The cooling of the air by the heat exchanger 40 increases the density of the bleed air prior to entering a secondary turbocompressor 42 of an energy recovery system 44. If the air was not cooled before entering the secondary compressor 42, the secondary air compressor would be unable to compress the thin air the desired amount. The air from the secondary compressor then flows into a second heat exchanger 46. The heat exchangers 40 and 46 may be adjusted to provide the desired output pressure and temperature which is preferably about 45 PSIG and lower than 150° F.

The heated and pressurized air then passes through a bulk liquid separator 50 which separates condensed vapors from the incoming air and discharges the separated fluids externally of the vehicle. The air then passes through an optional dual coalescing filter 52 which likewise directs the separated fluids externally of the vehicle. The bulk liquid separator 50 and the coalescing filter 52 protect the absorption beds 59 of the pressure swing adsorption system 60 from excessive absorption of liquids. The preferred embodiment for controlling the air temperature is provided by temperature control valve 61 by passing a portion of the hot filtered air and mixing it via connecting tube 61' into manifold 78 to obtain the desired air comfort level.

The pressure swing adsorption system 60 (FIGS. 3 and 4) includes two tanks A and B, which system is a known regenerative (self-cleaning) adsorption system using an adsorption bed 59 in each tank. As shown in FIG. 3, the compressed air first enters tank A through conduit 62 having a four-way inlet-purge valve 64 therein. Water, hydrocarbons and chemical agents are adsorbed in the bed of tank A while purified and dry air passes out of the tank A through conduit 66 at a pressure slightly lower than the inlet pressure. This purified air is delivered through a check valve 68 for continuous downstream use. A portion of this pure dry air is expanded through an orifice 70 to lower its pressure and passes through the bed of tank B in a direction opposite to the normal flow of contaminated air through tank B as indicated by the arrows. This flow purges the contaminates from the adsorbent material in the bed of the tank B and directs them through conduit 72 and the four-way valve 64 for discharge externally of the vehicle. A check valve 74 is held closed by the high pressure air in conduits 66 and 75 thus preventing high pressure air from flowing past check valve 74. At the end of a predetermined adsorption time, for example 30 seconds, the four-way inlet-purge valve 64 is switched to the position shown in FIG. 4. The clean adsorbent material in tank B then adsorbs the contaminants from the incoming air entering tank B through conduit 72 and flows out of tank B through conduits 77, check valve 74 and conduit 75. A portion of the clean air is expanded as it moves past orifice 70 and passes through tank A to purge the contaminates from the adsorbent material in the tank A which flows to the outer atmosphere through conduit 62 and four-way valve 64. This cyclic process continuously reverses the four-way valve 64 at the predetermined adsorption time interval. Any conventional means such as a conventional timer and electric or hydraulic power unit (not shown) is provided for reversing the valve 64. The expanded purge air drops in pressure between about 3-9 psig after expansion in response to its purging flow through the beds in tanks A and B.

The hot supply air drops in pressure between about 6-16 psig as it passes through the beds 59 and is directed through the conduit 75 into a turboexpander 76 (FIG. 2) of the energy recovery system 44. Expansion of the air through the turboexpander 76 drives the secondary turbo compressor 42 and also cools the air to about 70° F. for discharge directly into the crew compartment 24 or into the masks and suits of the crew in the crew compartment 24 of the vehicle 20 through the normal heating ducts or manifolds 78 provided in the vehicle. The volume of the clean cool air is about 9.75-11.25 lbs/minute at a pressure of about 1.5" of water.

The pressure swing adsorption system 60 and the series of regenerative (self-cleaning) filters (not shown) in the beds 59 in the tanks A and B eliminate all chemical warfare agents completely. All of the liquids, particulates, and aerosol contaminants known to be a threat have been removed by the preceding particulate filter 30, bulk liquid separator 50, and dual coalescing filter 52.

FIG. 5 illustrates a portion of a second embodiment 18a of the air purification and temperature controlling system 18 (FIG. 2) of the present invention, which portion is downstream of the first turbocompressor 38 that is driven by exhaust gases entering the expansion turbine 34 (FIG. 2). The second embodiment 18a adds certain optional features to the system illustrated in FIG. 2.

Since most of the components of the second embodiment of the temperature controlling system 18a are similar to those of the first embodiment, parts of the second embodiment that are equivalent to those of the first embodiment will be assigned the same numerals followed by the letter "a".

Compressed air at about 35 psig. and 350° F. is directed through the first heat exchanger 40a which cools the hot bleed air before entering the secondary turbocompressor 42a, which turbocompressor is not coupled to the turboexpander 76a as in the first embodiment but is driven by a motor 90 such as an electric or hydraulic motor. The air is then passed through the second heat exchanger 46a before being cooled to about 150° F. at about 45 psig. The air passing through the heat exchangers 40a and 46a is cooled by atmospheric air being blown through the heat exchangers as in the first embodiment by conventional blowers (not shown). The air at approximately 45 psig passes through the pressure swing adsorption system 60a where it is clean, and then passes through conduit 75a into the turboexpander 76a and drives a mechanism in the vehicle such as a fan or generator 92. If a generator is used, the power from the generator may be used to drive the motor 90 or to drive other mechanisms in the vehicle. An adjustable expansion valve 94 is connected in parallel with the turboexpander 76a by a conduit 96 and may be adjusted to control the desired flow of air through the turboexpander and thus the temperature of the clean air entering the crew compartment 24 (FIG. 1) of the vehicle 20 from outlets in ducts 78a (FIG. 5). By adjusting the valve 94 and/or the speed of the motor 90, the clean air discharged into the crew compartment 24 (FIG. 1) may be either heated or cooled to provide the desired temperature within the crew compartment 24.

A third embodiment of the temperature controlling system 18b of the invention is disclosed in FIG. 6 and is similar to the first embodiment. Parts of the third embodiment that are equivalent to the first embodiment will be assigned the same numerals followed by the letter "b".

Compressed air at about 35 psig and 350° F. is directed into the first heat exchanger 40b which cools the air before it enters the secondary turbocompressor 42b, by causing atmospheric air to flow therethrough and expel some of the heat to the atmosphere. The secondary turbocompressor 42b is driven by the turboexpander 76b. Air from the turbo compressor 42b flows through a closed heat exchanger 100 and through the pressure swing adsorption system 60b providing clean air in conduit 75b. The heat exchanger 100 transfers heat, not only to the atmosphere, but also to the heat transfer coils or tubes 102 that are connected to the conduit 75b by a conduit 104 having a temperature controlled valve 108 therein. The other side of the tubes 102 are connected to a downstream portion of the conduit 78b by a conduit 106. Flow divider 110 diverts part of the main air flow through the coil 102. The remaining air flows through turboexpander 76b and out of conduit 75b, through the turboexpander 76b which drives the secondary turbocompressor 42b as previously stated. Thus, a portion or all of the clean air discharged from the pressure swing adsorption system 60b can flow through the tubes 102 and draw a desired amount of heat from the second heat exchanger 100. By controlling the temperature controlled valve 108 the temperature of the clean air entering the turboexpander 76b may be controlled so that the air which is directed into the crew compartment through conduit 78b may be heated above 70° F. during winter operation or may be cooled to or below 70° F. as in the first embodiment of the invention for summer use. It is apparent, therefore, that the heat exchanger 100, the valve 108, the flow divider 110 and the turbocompressor 76b act as an energy recovery system and for selectively directing heated air or cooled air into the crew compartment 24 of the vehicle 20.

A fourth embodiment of the temperature controlling system 18c of the present invention is disclosed in FIG. 7 and is similar to the first and third embodiments of the invention. Parts of the fourth embodiment that are similar to the first embodiment will be assigned the same numerals followed by the letter "c".

Hot compressed bleed air from the first turbocompressor 38 (FIG. 2) is directed through a first closed heat exchanger 114 which includes first tubes 116 through which the hot bleed air flows to the secondary turbocompressor 42c (FIG. 7). The bleed air then flows through the second heat exchanger 46c, the pressure swing adsorption system 60c, conduit 75c the turboexpander 76c and conduit 78c to the crew compartment. In this embodiment of the invention the energy recovery system includes second coils or tubes 118 in the closed heat exchanger 114 which draws heat from the first tubes 116. The second tubes 118 are connected to the output conduit 78c by conduit 120 with adjustable temperature controlled valve 122 therein, and a second conduit 124. A flow control device 126 is disposed between conduits 120,124 in conduit 78c. Thus, if it is desired to direct cool air at about 70° F. into the crew compartment, as in the first embodiment, the valve 122 is closed or partially closed to provide the desired temperature. If the vehicle 20 is operating in a cold environment where hot air rather than cool air is desired in the crew compartment, most, if not all, of the clean air from the turboexpander 76c is directed through temperature controlled valve 122, tubes 118, and conduit 124 and out of the conduit 78c into the compartment.

A fifth embodiment of the temperature controlling system 18d is disclosed in FIG. 8 and is similar to the first and fourth embodiments. Parts of the fifth embodiment that are similar to the first embodiment will be assigned the same numerals followed by the letter "d".

Hot compressed bleed air from the first turbocompressor 38 (FIG. 2) is directed through first coils or tubes 130 in a closed heat exchanger 132 (FIG. 8), through the second turbocompressor 42d, through the second heat exchanger 46d, and through the pressure swing adsorption system 60d. Thereafter, if heating is desired, a portion or all of the clean air may flow through a conduit 134 having a first adjustable temperature controlled valve 136 therein, through second tubes 138 in the heat exchanger 132, and to the output side of the turboexpander 76d through a conduit 140 into conduit 78d. A flow divider 142 directs a portion of the air through temperature controlled valve 136 into conduit 134 and 140 for heating in heat exchanger 132 depending upon the amount of heat desired from the clean output air of the turboexpander 76d that is directed through conduit 78d into the crew compartment. If cool air is required in the crew compartment, the temperature controlled valve 136 is adjusted to prevent or substantially restrict flow of air therepast, increasing the flow past flow divider 142 depending upon the amount of cooling required in the crew compartment.

It will be understood that the closed heat exchangers 100 (FIG. 6), 114 (FIG. 7), and 132 (FIG. 8) each include coils or tubes within their housings, which housings are normally closed to the atmosphere when it is desired to heat the crew compartment. However, it will be understood that the housings may be partially opened to permit conventional fans in the vehicle to blow atmospheric air through the housings to cool the air passing through the tubes when desired.

In normal operation of the several embodiments of the air purification and temperature controlling system 18 of the present invention, the expansion turbine 34 (FIG. 2) of the turbocharger 36 is driven by the exhaust gases from the engine 22 and the turbocompressor 42 is driven by the turboexpander 76 of the energy recover system 44 thereby requiring no additional power to operate the system 18. However, during combat it is sometimes desirable to place the vehicle 20 in a "SILENT-WATCH" mode, at which time the engine is not running, thereby minimizing detection of the vehicle by heat sensors and sound detectors or the like. When under "SILENT-WATCH", fuel is directed into the combustor 32 (FIG. 2) which is burned to direct hot exhaust gases into the expansion turbine 34 of the turbocharger 36. The first turbocompressor 38 then directs air through the system as previously described to provide clean cool (or heated) air for the crew in the crew compartment 24 when the engine 22 is not operating.

Some of the advantages of the air purification and temperature controlling system of the present invention over systems using the prior art carbon filters are as follows:

1. Carbon filters when treated with chromium salts produce a carcinogenic by-product which is harmful to health if used over an extended time period. The subject system does not produce such carcinogenic by-products.

2. Carbon filters require frequent replacement thus increasing the logistical burden for providing a ready supply of filters, increasing the contamination burden for used filters; and increasing exposure to the crew while changing filters in a contaminated area, or loss of tactical use of the vehicle when driven out of the contaminated area to change filters.

3. The system of the present invention is completely regenerative eliminating the need for replacement filters, except if using the optional coalescing filter which requires a change only once per year.

4. The system provides collective protection to all personnel in the combat vehicle from all known or suspected chemical agents, biological agents and nuclear particulates for an indefinite period of time.

5. The system provides pure clean air to the crew as well as cooling/heating the air to about 70° F.

6. The system is composed of a plurality of known and tested small components which may be placed at different locations in current and future vehicles and be interconnected by conduits thereby minimizing space problems in the vehicle.

7. The system reduces the overall energy consumption by operating the pressure swing system at relatively low pressures (30 to 45 psig.) and by recuperating otherwise wasted energy from the engine exhaust and from the pressurized air with the use of expansion turbines.

8. A carbon filters life is reduced by high relative humidity whereas the pressure swing adsorption beds are not degraded by moisture.

9. Carbon filter's have a relatively short shelf life whereas the pressure swing adsorption system and its supporting filters have an indefinite shelf life under various storage conditions.

The air purification and temperature controlling system of the present invention is specifically directed to supplying cool air at slightly above atmospheric pressure and about 70° F. to conventional masks and microclimate protective suits worn by at least one crew member of a combat vehicle. It will be understood, however, that certain of the claims are intended to be broad enough to cover similar larger systems which are capable of directing cooled or heated air directly into the crew compartments of other vehicles or structures, without requiring that the crew members wear protective suits, and which provide an atmosphere within the crew compartment that is slightly above atmospheric pressure and is maintained at a comfortable temperature of about 70° F. Such a system would, of course, require larger components for handling larger volumes of air including larger power units which use exhaust gases for driving the first expansion turbine.

From the foregoing description it is apparent that the air purification and temperature controlling system of the present invention removes dust and particulates as well as all known nuclear, biological and chemical agents used against the crews of combat vehicles, or other vehicles or structures, while at the same time changing the temperature of the air by heating or cooling the air to provide 70° F. air to the crew. The system optimizes energy consumption by using exhaust gases from the engine to drive a first turbocompressor which directs heated compressed air into a second turbocompressor driven by an expansion turbine by means of clean air discharged from a pressure swing adsorption system thereby providing a continuous supply of cool clean output air to the protective suits worn by the crew when in the crew compartment of the vehicle at about 70° F. and at a pressure slightly above atmospheric pressure. The second-fifth embodiments disclose several systems for heating the air when the vehicle is used in cold climates to maintain the clean air supplied to the crew at about 70° F.

Although the best mode contemplated for carrying out the present invention has been herein shown and described, it will be apparent that modification and variation may be made without departing from what is regarded to be the subject matter of the invention.

What is claimed is:

1. A method of directing clean air at a desirable temperature to the crew compartment of a vehicle when in an environment of contaminated air comprising the steps of:
   initially compressing and raising the temperature of the contaminated air;
   subjecting the heated and compressed air to an initial cooling step for increasing the density of the air;
   compressing the initially heated and compressed air;
   subjecting the heated and compressed air to a secondary cooling step for decreasing the temperature of the contaminated air to a temperature lower than that at said initial compression step;

directing the contaminated air received from said secondary cooling step through a regenerative pressure swing adsorption system for providing clean output air with the contaminants removed therefrom; and expanding and controlling the temperature of the clean output air before discharging the clean output air into the crew compartment of the vehicle for use by the crew.

2. A method according to claim 1 wherein at least one person is in the crew compartment and is wearing a mask and a micro climate cooling and heating suit, and additionally including the steps of directing the clean output air into the protective mask and through the suit for providing air for breathing and body temperature control.

3. A method according to claim 1 wherein the environment of contaminated air includes nuclear, biological and chemical contaminates therein.

4. A method according to claim 3 wherein the initial compression step raises the temperature of the air to about 350° F. at about 35 psig and wherein the contaminated air is cooled to about 150° F. and is increased in pressure to about 45 psig before entering the regenerative adsorption system.

5. A method according to claim 3 wherein at least one person is in the crew compartment and is wearing a mask and a micro climate cooling and heating suit, and additionally including the step of directing the clean output air into the protective mask and through the suit for providing air for breathing and body temperature control.

6. A method according to claim 1 wherein the vehicle is powered by a combustion power unit, and additionally comprising the steps of using energy from the exhaust gases of the power unit for initially compressing and raising the temperature of the contaminated air, and using the energy given off from the air when expanding and cooling the air for supplying the energy needed for performing the step of again compressing the initially heated and compressed air.

7. A method according to claim 6 wherein the environment of contaminated air includes nuclear, biological or chemical contaminates therein.

8. A method of providing cool clean air to the crew compartment of a vehicle when in an environment of air contaminated with nuclear, biological or chemical warfare agents comprising the steps of:
directing exhaust gases of a combustion power unit into a first expansion turbine;
removing particulates from the contaminated air;
compressing and raising the temperature of the contaminated air with a first turbocompressor connected in driving engagement with a first expansion turbine;
subjecting the heated and compressed air to an initial cooling step for increasing the density of the air;
passing the initially cooled air through a driven secondary turbocompressor for again raising the pressure of the initially cooled air;
subjecting the heated and compressed air to a secondary cooling step for decreasing the temperature of the contaminated air to a temperature lower than that of said first compression step;
directing the contaminated air received from said second cooling step through a regenerable adsorption system for providing clean air with the contaminates removed therefrom; and passing the clean air through a secondary turboexpander that drives said secondary turbocompressor and cools the clean air to provide cool clean air to personnel within the vehicle.

9. A method according to claim 8 wherein the clean air discharged into the crew compartment is first directed into masks and protective microclimate cooling and heating suits worn by the crew members who use the clean air for breathing and body temperature control thereby providing a very energy efficient air decontaminating and temperature controlling method.

10. A method according to claim 9 wherein the combustion power unit is an internal combustion engine.

11. A method according to claim 9 wherein the combustion power unit is a combustor.

12. A system for providing clean air to the personnel compartment of a vehicle when in an environment of contaminated air comprising:
first compressor means for compressing and raising the pressure of the contaminated air;
first cooling means for cooling the heated and compressed air to increase the density of the air;
second compressor means for again compressing the initialloyl compressed air for raising the pressure thereof above that provided by said first compressor means;
second cooling means for lowering the temperature of the contaminated air below that of the air discharged from said second compressor means;
regenerable adsorption means for receiving the contaminated air from said second cooling means for providing clean output air with the contaminates removed therefrom;
means or expanding the clean output air thereby recovering energy from the air being cooled before discharging the cleaned and cooled output air into the personnel compartment of the vehicle, said energy received from expansion of the air being used to drive a component on the vehicle thereby providing an energy efficient system;
regenerable particulate filter means for receiving and prefiltering the contaminated air and directing the prefiltered air to said first compressor means;
a combustion powered means in the vehicle; and
a turbocharger operatively connected to said combustion power means and including an expansion turbine;
said first compressor means including an air compression turbine operatively connected to said expansion turbine and receiving intake air from said particulate filter means;
said combustion powered means directing exhaust gases into said expansion turbine for driving said first compression turbine for compressing and raising the pressure of the contaminated but prefiltered air, first conduit means for directing a major portion of the air into said combustion power means, and second conduit means for directing a minor portion of said prefiltered air into said first cooling means.

13. An apparatus according to claim 12 wherein said combustion powered means is an internal combustion engine.

14. An apparatus according to claim 13 wherein said regenerable particulate filter removes dust and other particles from contaminated air before the air enters said first compression turbine.

15. An apparatus according to claim 12 wherein said combustion powered means is a combustor.

16. An apparatus according to claim 12 and additionally comprising a bulk liquid separator disposed between and communicating with said second cooling means and said regenerable adsorption means for removing excessive condensate from said contaminated air and discharging the liquid to the atmosphere.

17. A system according to claim 16 and additionally comprising a dual coalescing filter which receives contaminated prefiltered air from said bulk liquid separator and causes the liquid drops to combine with larger drops and be discharged to the outer atmosphere before directing the contaminated air into said regenerable adsorption means.

18. A system for providing clean air to the personnel compartment of a vehicle when in an environment of contaminated air comprising:
   first compressor means for compressing and raising the pressure of the contaminated air;
   first cooling means for cooling the heated and compressed air to increase the density of the air;
   second compressor means for again compressing the initially compressed air for raising the pressure thereof above that provided by said first compressor means;
   second cooling means for lowering the temperature of the contaminated air below that of the air discharged from said second compressor means;
   regenerable adsorption means for receiving the contaminated air from said second cooling means for providing clean output air with the contaminates removed therefrom;
   means for expanding the clean output air thereby recovering energy from the air being cooled before discharging the cleaned and cooled output air into the personnel compartment of the vehicle, said energy recovered from the expansion of the air being used to drive a component of the vehicle thereby providing an energy efficient system;
   said regenerable adsorption means being a pressure swing adsorption system including first and second regenerable adsorption beds, means for alternately directing the high pressure air received from said second cooling means into said first and second adsorption beds for cleaning the contaminated air, and for alternately bleeding a portion of the clean air from said first and second beds into said second and first beds to purge contaminates therefrom for sequentially cleaning contaminates from said beds;
   orifice means for reducing the pressure of the purging air prior to purging said beds;
   conduit means connected in parallel across said expanding and cooling means, and an adjustable temperature controlling expansion valve in said parallel conduit means and adapted to be adjusted to provide either heated or cooled air to the personnel compartment of the vehicle.

19. A system for providing clean air to the personnel compartment of a vehicle when in an environment of contaminated air comprising:
   first compressor means for compressing and raising the pressure of the contaminated air;
   first cooling means for cooling the heated and compressed air to increase the density of the air;
   second compressor means for again compressing the initially compressed air for raising the pressure thereof above that provided by the first compressor means;
   second cooling means for lowering the temperature of the contaminated air below that of the air discharged from said second compressor means;
   regenerable adsorption means for receiving the contaminated air from said second cooling means for providing clean output air with the contaminates removed therefrom;
   means for expanding the clean output air thereby recovering energy from the air being cooled before discharging the cleaned and cooled output into the personnel compartment of the vehicle, said energy recovered from expansion of the air being used to drive a component of the vehicle thereby providing an energy efficient system;
   regenerable particulate filter means for receiving and prefiltering the contaminated air and directing the prefiltered air to said first compressor means;
   a combustion powered means in the vehicle; and
   a turbocharger operatively connected to said combustion power means and including an expansion turbine; said first compressor means including an air compression turbine operatively connected to said expansion turbine and receiving intake air from said particulate filter means; said combustion power means directing exhaust gases into said expansion turbine for driving said first compression turbine for compressing and raising the pressure of the contaminated but prefiltered air, first conduit means for directing a major portion of the air into said combustion powered means, second conduit means for directing a minor portion of said prefiltered air into said first cooling means, said combustion powered means being an internal combustion engine, and additionally comprising manifold means connected between said means for expanding the output air and said personnel compartment for directing the clean air into a protective mask and into a micro cooling and heating suit worn by at least one person in the personnel compartment of the vehicle who uses the air for breathing and body temperature control.

20. A regenerative air purification and temperature controlling system for removing nuclear, biological and chemical contaminates from air and providing clean air to a compartment at a desirable temperature comprising:
   means defining a particulate filter for filtering particulates from the air;
   power means having exhaust gases discharged therefrom at high temperatures and pressures;
   first air compressor means driven by the exhaust gases for compressing and heating air containing the contaminates;
   first cooling means for partially cooling a portion of the air received from the first air compressing means and for increasing the density of the contaminated air;
   second air compressor means for further compressing the partially cooled contaminated air to a pressure greater than that received from said first compressor means;
   second cooling means for cooling the contaminated air received from said second compressor means to an intermediate temperature;
   pressure swing regenerable adsorption means for receiving the contaminated air from said second cooling means and discharging clean air at the intermediate temperature;

air expanding means connected to said second air compressor means, said air expanding means recovering energy from the clean air that is received from said pressure swing regenerable adsorption means in response to expanding the air thereby providing the sole source of energy to drive said second air compressor means, and means for directing clean air at a desired temperature into said compartment, said power means being an internal combustion engine.

21. A regenerative air purification and temperature controlling system for removing nuclear, biological and chemical contaminates from air and providing clean air to a compartment at a desirable temperature comprising:

means defining a particulate filter for filtering particulates from the air;

power means having exhaust gases discharged therefrom at high temperatures and pressures;

first air compressor means driven by the exhaust gases for compressing and heating air containing the contaminates;

first cooling means for partially cooling a portion of the air received from the first air compressing means and for increasing the density of the contaminated air;

second air compressor means for further compressing the partially cooled contaminated air to a pressure greater than that received from said first compressor means;

second cooling means for cooling the contaminated air received from said second compressor means to an intermediate temperature;

pressure swing regenerable adsorption means for receiving the contaminated air from said second cooling means and discharging clean air at the intermediate temperature;

air expanding means connected to said second air compressor means, said air expanding means recovering energy from the clean air that is received from said pressure swing regenerable adsorption means in response to expanding the air thereby providing the sole source of energy to drive said second air compressor means, and means for directing clean air at a desired temperature into said compartment, wherein said power means being a combustor.

22. A regenerative air purification and temperature controlling system for removing nuclear, biological and chemical contaminates from air and providing clean air to a compartment at a desirable temperature comprising:

means defining a particulate filter for filtering particulates from the air;

power means having exhaust gases discharged therefrom at high temperatures and pressures;

first air compressor means driven by the exhaust gases for compressing and heating air containing the contaminates;

first cooling means for partially cooling a portion of the air received from said first air compressing means and for increasing the density of the contaminated air;

second air compressor means for further corresponding the partially cooled contaminated air to a pressure greater than that received from said first compressor means;

second cooling means for cooling the contaminated air received from said second compressor means to an intermediate temperature;

pressure swing regenerable adsorption means receiving the contaminated air from said second cooling means and discharging clean air at the intermediate temperature;

air expanding means connected to said second air compressor means, said air expanding means recovering energy from the clean air that is received from said pressure swing regenerable adsorption means in response to expanding the air thereby providing the sole source of energy to drive said second air compressor means, and means for directing the clean air at a desired temperature into the compartment, said power means being on internal combustion engine, said first air compressor means being the first turbocompressor of a turbosupercharger which directs a major portion of the air into said engine for use as fuel and which directs a minor portion of the compressed air directly into said first cooling means.

23. A system according to claim 22 wherein said first air compressor means compresses the contaminated air to about 35 psig at a temperature of about 350° F., wherein said first cooling means increases the density of the air enabling said second air compressing means to raise the pressure of the contaminated air to about 45 psig at a temperature of about 150° F. before entering said pressure swing regenerable adsorption means.

24. A system according to claim 23 wherein said second air compressor means is a secondary turbocompressor, wherein said air expanding means is a turboexpander connected in driving engagement to said second compressor means, and wherein said turboexpander directs air into said compartment at about 70° F. and a pressure slightly above atmospheric pressure.

25. An apparatus according to claim 24 wherein the clean air entering the compartment is directed into a protective mask and a micro cooling and heating suit worn by a person in the compartment who uses the air for breathing and for body temperature control.

26. A system according to claim 23 and additionally comprising a bulk liquid separating means for receiving contaminated air from said second cooling means, for separating excessive liquid vapors from said contaminated air, and for discharging the separated liquid externally of the compartment prior to entry of the air into said pressure swing regenerable adsorption means.

27. A system according to claim 26 and additionally comprising a dual coalescing filter which receives filter which receives contaminated air from said bulk liquid separating means and causes liquid drops to combine into single larger drops for discharging the larger drops externally of the compartment before directing the contaminated air into said pressure swing regenerable adsorption means.

28. A system for providing clean air to the personnel compartment of a vehicle when in an environment of contaminated air comprising:

first compressor means for compressing and raising the pressure of the contaminated air;

first cooling means for cooling the heated and compressed air to increase the density of the air;

second compressor means for again compressing the initially compressed air for raising the pressure thereof above that provided by said first compressor means;

second cooling means for lowering the temperature of the contaminated air below that of the air discharged from said second compressor means;

regenerable adsorption means for receiving the contaminated air from said second cooling means for providing clean output air with the contaminates removed therefrom;

means for expanding the clean output air thereby recovering energy from the air being cooled before discharging the cleaned and cooled output air into the personnel compartment of the vehicle, said energy recovered from the expansion of the air being used to drive a component of the vehicle thereby providing an energy efficient system;

said regenerable adsorption means being a pressure swing adsorption system including first and second regenerable adsorption beds, means for alternately directing the high pressure air received from said second cooling means into said first and second adsorption beds for cleaning the contaminated air, and for alternately bleeding a portion of the clean air from said first and second beds into said second and first beds to purge contaminates therefrom for sequentially cleaning contaminates from said beds;

orifice means for reducing the pressure of the purging air prior to purging said beds;

said second cooling means being disposed in flow communication between said second compressor means and said regenerable adsorption means;

first conduit means connecting said adsorption means to said turboexpander means;

a flow divider in said first conduit means;

second conduit means connected between said turboexpander and said personnel compartment; third conduit means passing through said second cooling means and connected to said first conduit means upstream of said flow divider and to said second conduit means downstream of said turboexpander; and a temperature control valve in said third conduit means, said temperature control valve and said flow divider being adjustable to provide either heated or cooled air to the personnel compartment of the vehicle.

29. A system for providing clean air to the personnel compartment of a vehicle when in an environment of contaminated air comprising:

first compressor means for compressing and raising the pressure of the contaminated air;

first cooling means for cooling the heated and compressed air to increase the density of the air;

second compressor means for again compressing the initially compressed air for raising the pressure thereof above that provided by said first compressor means;

second cooling means for lowering the temperature of the contaminated air below that of the air discharged from said second compressor means;

regenerable adsorption means for receiving the contaminated air from said second cooling means for providing clean output air with the contaminates removed therefrom;

means for expanding the clean output air thereby recovering energy from the air being cooled before discharging the cleaned and cooled output air into the personnel compartment of the vehicle, said energy recovered from the expansion of the air being used to drive a component of the vehicle thereby providing an energy efficient system;

said regenerable adsorption means being a pressure swing adsorption system including first and second regenerable adsorption beds, means for alternately directing the high pressure air received from said second cooling means into said first and second adsorption beds for cleaning the contaminated air, and for alternately bleeding a portion of the clean air from said first and second beds into said second and first beds to purge contaminates therefrom for sequentially cleaning contaminates from said beds;

orifice means for reducing the pressure of the purging air prior to purging said beds;

said first cooling means being disposed in flow communication between said first compressor means and said second compressor means;

first conduit means connected between said regenerable adsorption means and said turboexpander means;

second conduit means connected between said turboexpander and the personnel compartment of the vehicle;

third conduit means passing through said first cooling means and having two branches connected to said second conduit means;

an adjustable temperature control valve in said first branch; and a flow control device in said second conduit means downstream of said first branch, said flow control device in said temperature control valve being adjsutable to provide either heated or cooled air to the personnel compartment of the vehicle.

30. A system for providing clean air to the personnel compartment of a vehicle when in an environment of contaminated air comprising:

first compressor means for compressing and raising the pressure of the contaminated air;

first cooling means for cooling the heated and compressed air to increase the density of the air;

second compressor means for again compressing the initially compressed air for raising the pressure thereof above that provided by said first compressor means;

second cooling means for lowering the temperature of the contaminated air below that of the air discharged from said second oompressor means;

regenerable adsorption means for receiving the contaminated air from said second cooling means for providing clean output air with the contaminates removed therefrom;

means for expanding the clean output air thereby recovering energy from the air being cooled before discharging the cleaned and cooled output air into the personnel compartment of the vehicle, said energy recovered from the expansion of the air being used to drive a component of the vehicle thereby providing an energy efficient system;

said regenerable adsorption means being a pressure swing adsorption system including first and second regenerable adsorption beds, means for alternately directing the high pressure air received from said second cooling means into said first and second adsorption beds for cleaning the contaminated air, and for alternately bleeding a portion of the clean air from said first and second beds into said second and first beds to purge contaminates therefrom for sequentially cleaning contaminates from said beds;

orifice means for reducing the pressure of the purging air prior to purging said beds;

said first cooling means being disposed between said first compressor means and said second compressor means;

first conduit means connected between said regenerable adsorption means and said turboexpander means;

second conduit means connected between said turboexpander means and the personnel compartment of the vehicle;

third conduit means passing through said first conduit means and having one branch connected to said first conduit means and a second branch connected to said second conduit means;

an adjustable temperature control valve in said first branch, and a flow divider in said first conduit between said first branch and said turboexpander, said temperature control valve and said flow divider being adjustable to provide either heated or cooled air to the personnel compartment of the vehicle.

31. A system for directing clean air at a desirable temperature to the crew compartment of a vehicle when in an environment of contaminated air comprising:

means for initially compressing and raising the temperature of the contaminated air;

means for initially cooling the heated and compressed air for increasing the density of the air;

means for again compressing the initially heated and compressed air;

secondary cooling means for again cooling the heated and compressed air for decreasing the temperature of the contaminated air to a temperature lower than that provided by said initial compressing means;

means for directing the contaminated air received from said secondary cooling means through a regenerative pressure swing adsorption system for providing clean output air with the contaminates removed therefrom; and means for expanding and controlling the temperature of the clean output air before discharging the clean output air into the crew compartment of the vehicle for use by the crew.

* * * * *